Aug. 9, 1960  F. E. CONN ET AL  2,948,343
PROPELLER MECHANISM

Filed Dec. 4, 1953  3 Sheets-Sheet 1

INVENTORS
Francis E. Conn
BY James R. Kessler

Craig L. Morton
Attorney

INVENTORS
Francis E. Conn
BY James R. Kessler
Craig V. Morton
Attorney

United States Patent Office 2,948,343
Patented Aug. 9, 1960

2,948,343

PROPELLER MECHANISM

Francis E. Conn, Piqua, and James R. Kessler, Vandalia, Ohio, assignors to General Motors Corporation, Detroit, Mich., a corporation of Delaware Filed Dec. 4, 1953, Ser. No. 396,214

8 Claims. (Cl. 170—135.24)

This invention pertains to variable pitch propellers, and particularly to drive and control arrangements for contra-rotation propellers.

Heretofore, constant speed, contra-rotation propellers assemblies, including a variable pitch inboard propeller element and a variable pitch outboard propeller element, having been driven in opposite directions by a prime mover at the same angular velocity through a planetary gear set including fixed and rotatable ring gears. A typical illustration of such a drive arrangement is disclosed in Patent No. 2,300,268, Stewart, wherein the propellers are rotated at a fixed velocity ratio through a planetary gear set of the aforementioned type, and wherein the angular velocity of the propellers may be equal or unequal. This drive arrangement is of such a nature that irrespective of the pitch position of the blades in the contra-rotating propeller elements, the ratio of the angular velocity of both elements is fixed. Accordingly, with this type of drive arrangement, the torque or thrust of the propeller elements differs appreciably at times, thereby resulting in disadvantageous effects which render an aircraft difficult to maneuver. Moreover, some prior contra-rotation propeller assemblies embody a pitch control system wherein the pitch changing means of the outboard propeller element is dependent upon, or is a slave, to the pitch position of the inboard element. A typical illustration of this type of pitch control system is disclosed in Reissue Patent 23,253, Blanchard et al. In this type of pitch control system, there is an inherent time constant blade angle lag between pitch changes in the two propeller elements. That is, pitch changes in the propeller elements do not occur concomitantly, by reason of the nature of the control system. When a propeller having this type of pitch control system is driven through a drive arrangement wherein the propellers are driven at a fixed velocity ratio, speed instability, or "hunting" has been a major problem. In order to compensate for these factors, to which speed instability has been attributed, governing systems have been devised with elaborate acceleration sensitive control systems, of the type disclosed and claimed in copending application, Serial No. 94,984, filed May 24, 1949, in the name of Dinsmore et al., now Patent No. 2,669,312. However, electronic acceleration sensitive systems, or hydraulic acceleration sensitive systems, while operable to reduce the amount of instability, are not entirely satisfactory. Accordingly, among our objects are the provision of means for stabilizing contra-rotation propellers by driving the same through means operable to maintain a predetermined torque balance between the propellers; the further provision of a drive arrangement for contra-rotation propellers wherein the torque is equally divided between the propeller elements, thereby eliminating variable gyroscopic effects on an aircraft; a further provision of means for correlating the pitch movement of contra-rotation propeller elements so as to provide automatic damping of speed variations; and the still further provision of a contra-rotation propeller assembly including speed governing means for maintaining the angular velocity of the outboard propeller element in synchronism with the angular velocity of the inboard propeller element by adjusting the pitch position thereof, while at the same time maintaining a torque balance between the propeller elements.

The aforementioned and other objects are accomplished in the present invention by rotating the two propeller elements in opposite directions from a single prime mover through gear set, which permits differences in the angular velocities of the two propeller elements, while maintaining a constant division of torque therebetween. Specifically, in one embodiment disclosed herein, a beta type pitch control system is employed, i.e. the pitch control system of the outboard propeller element is a slave to the pitch position of the inboard propeller element thereby resulting in a predetermined time constant, or lag, between pitch changes in the two propeller elements, with the outboard following the inboard. When a propeller assembly of this type is driven through a free wheeling planetary gear set, the torque absorption by propellers may be equally divided although their angular velocities may vary appreciably. In any event, and depending upon the gear design, a constant division of torque will be maintained, irrespective of angular velocity transients. The improved result achieved by this system resides in the fact that upon the occurrence of an off-speed as sensed by the governor of the inboard propeller element, the off-speed will be corrected without artificial damping devices and, yet, not result in "hunting," or undesirable speed variations which result in instability.

In another embodiment, the angular velocity of the outboard propeller element is maintained in synchronism with the angular velocity of the inboard propeller element by means of a synchronizing governor and the pitch control mechanism. The two propeller elements are driven through a free wheeling planetary gear set in opposite directions so that a predetermined torque division, or balance, is maintained therebetween. The system operates in much the same manner as in the previous embodiment in that the speed synchronization introduces an artificial time lag in the pitch changes of the outboard propeller element so as to prevent instability during speed changes of the prime mover by effectively providing acceleration sensitivity.

Further objects and advantages of the present invention will be apparent from the following description, reference being had to the accompanying drawings wherein a preferred embodiment of the present invention is clearly shown.

Figure 1:
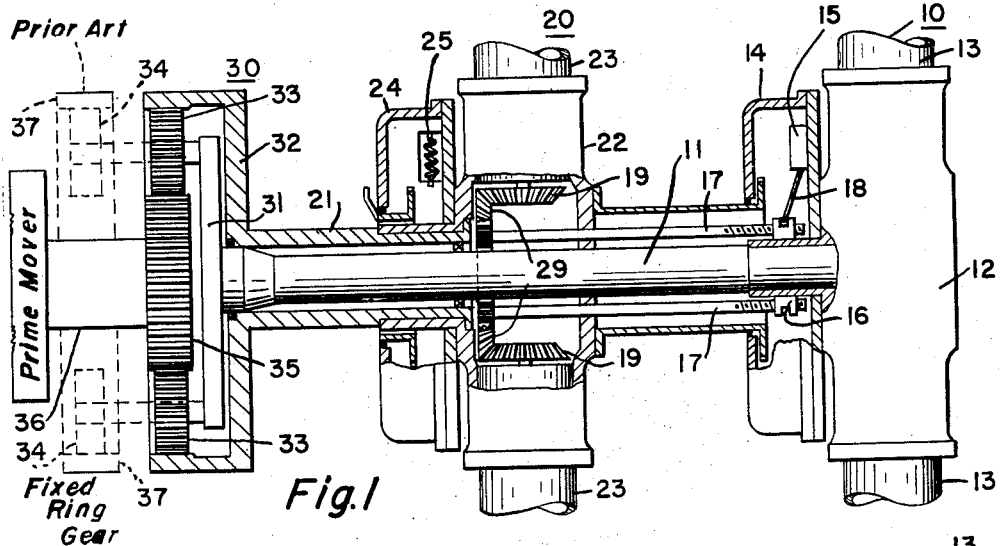
Fig. 1 is a fragmentary view, partly in section and partly in elevation, illustrating the prior art system in dotted and full lines, and the system of the invention in full lines only.

With particular reference to Fig. 1 of the drawings, and considering the entire view, that is the full and dotted line portion, a typical prior art dual rotation propeller is disclosed.

The propeller assembly includes an outboard propeller element 10 and an inboard propeller element 20, which elements are driven in opposite directions at a fixed velocity ratio, which may, or may not, be equal, through coaxial shafts 11 and 21.

The propeller assembly may be of the type disclosed and claimed in Reissue Patent No. 23,253, Blanchard et al., wherein the outboard propeller element comprises a hub 12 having a plurality of radially disposed sockets, which receive and support propeller blades 13 for rotation about their longitudinal axes. The specific form of pitch changing mechanism forms no part of this invention, as it will be recognized by those skilled in the art that the system disclosed herein is applicable to all systems which have been devised, or will be devised. In the embodiment disclosed, the pitch adjusting mechanism is contained within the hub 12, and is actuated by fluid under pressure developed in a regulator 14 and distributed to the pitch changing motors by a valve 15.

The valve 15 rotates with the propeller element 10, as does the regulator 14. The valve 15 is controlled by the position of an axially movable control ring 16, which has threaded engagement with high lead screws 17. The specific interconnection between the control shoe and the valve 15 will not be dealt with in detail, but may be of the type disclosed in the aforementioned reissue patent, and is herein indicated by the line 18. The inboard propeller element 20, likewise, includes a hub 22 having a plurality of radially disposed sockets which receive and rotatably support propeller blades 23 for movement about their longitudinal axes. Each propeller blade 23 is operatively connected with a blade gear 19, which, in turn, meshes with a master blade gear 29 which has operative connections with the high lead screws 17. This is what is known as the "beta type" pitch control system. That is, a system wherein the pitch adjusting mechanism of the outboard propeller element 10 is controlled by the pitch position of the inboard propeller element. Thus, as depicted in Figure 1, the position of the master blade gear 29 represents the pitch position of the inboard propeller blades 23, and any changes in the pitch position of the blades 23 will result in rotation of the high lead screw 17 so as to impart axial movement to the control ring 16 of the outboard propeller element. Accordingly, the valve 15 will be actuated through the linkage 18 so as to energize the pitch changing means of the outboard propeller element whereby the pitch changes in the outboard propeller element follow those in the inboard propeller element. As those skilled in the art will realize, there is an inherent time constant, or lag, between the pitch changes in the two propeller elements, in this type of system.

The inboard propeller element also includes a regulator 24, which is connected to rotate with the hub 22, which regulator carries a centrifugally responsive governor valve 25, which may be of the type disclosed in the aforementioned reissue patent. The governor valve 25 may be adjusted so as to maintain the rotative speed of the inboard propeller element 20 substantially constant, by controlling the flow of pressure fluid developed in the regulator 24, and directing it to the pitch changing means carried by the hub 22. Thus, the propeller organization disclosed in Fig. 1 is known as a constant speed propeller. The shaft 11 is connected with the planet carrier 31 of a drive gear arrangement 30 indicated in full and dotted lines. The drive gear arrangement 30 includes a rotatable ring gear 32 to which the shaft 21 is connected. The planet carrier 31 carries two sets of axially spaced planet gears 33 and 34. The planet gears 33 mesh with the ring gear 32 and with a sun gear 35, which is connected to and rotates with a prime mover driven shaft 36. The planet gears 34 mesh with a fixed ring gear 37. This type of drive arrangement is illustrated in the aforementioned Stewart Patent 2,300,268, and results in a drive arrangement wherein shafts 11 and 21 are rotated in opposite directions at a fixed velocity ratio. That is, the velocities of the shafts 11 and 21 may be equal or unequal, depending upon the gearing employed, but the angular velocity of the shaft 11 always bears the same ratio to the angular velocity of the shaft 21, irrespective of the pitch positions of the blades in the inboard and outboard propeller elements. Accordingly, it will be apparent to those skilled in the art that such a drive arrangement will always result in a variable division of torque between the two propeller elements.

Figure 5:
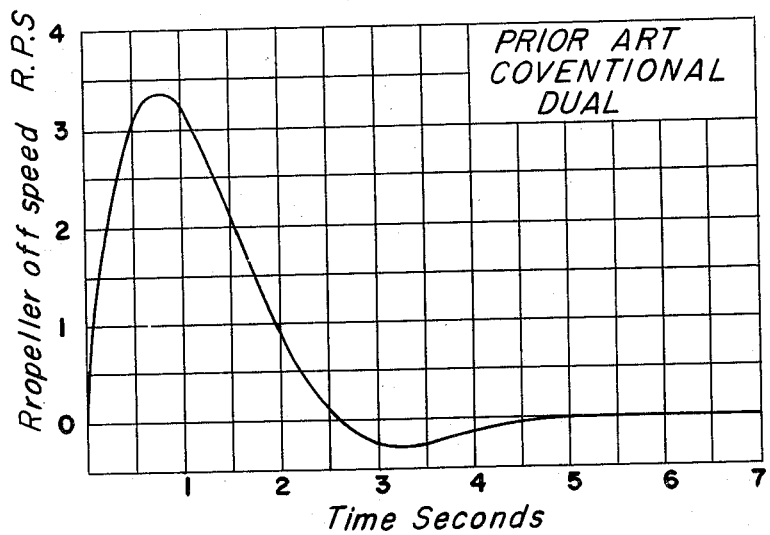
Fig. 5 is a graph depicting prior art operation.

Now, with reference to Fig. 5, the operation of the prior art propeller assembly will be described, particular reference being had to the "hunting" which occurs during speed variation. In the graph, in Fig. 5, the abscissa represents time in seconds, while the ordinate represents propeller off-speed in revolutions per second. When the propeller assembly experiences an off-speed, which is represented by a departure from the ordinate point indicated by zero, the governor valve 25 of the inboard propeller element will sense this speed error, or speed deviation, and will respond by directing pressure fluid to the pitch changing means of the inboard propeller element so as to adjust the pitch position thereof and return the angular velocity to the selected value. Thus, if the angular velocity decreases, the governor valve 25 will respond so as to decrease the pitch position of the propeller blades, thereby decreasing the load so as to enable the angular velocity to increase. In Fig. 5, the conditions are represented for an over-speed error, in which instance the governor valve 25 will respond and direct pressure fluid to the pitch changing means so as to increase the pitch position of the propeller blades, thereby increasing the load and reducing the angular velocity. Moreover, as the propeller elements of the prior art system in Fig. 1 rotate at a fixed velocity ratio, which, as shown, is equal, the angular velocity of the prime mover, and both propeller elements are depicted by a single line. As seen in Fig. 5, at approximately three-quarters of a second, the maximum off-speed of about 3.3 r.p.s. is reached, and as the governor valve responds to this over-speed, the propeller speed, as well as the prime mover speed, is reduced, until at about 2.6 seconds, the over-speed has been reduced to zero. However, due to the inherent time lag between pitch changes in the inboard and outboard propeller elements, the speed curve descends below the zero, or onspeed condition, and into the under-speed range, which results in instability. This type of speed control, a control in which corrections result in fluctuations about the onspeed condition, is caused by the inherent time constant between pitch changes in a beta type system. Moreover, while only one such fluctuation is indicated by the graph in Fig. 5, it is well recognized that in actual practice the speed fluctuates about the onspeed line for some time before a stable condition is reached. To correct for this instability, acceleration sensitive devices of the type disclosed in the aforementioned copending application, have been employed to minimize the speed fluctuations about the onspeed line during speed corrections.

Now having reference to only the solid line portion of Fig. 1, the operation and construction of the improved drive arrangement will be described. In the full lines of Fig. 1, the gear drive is constituted by a free wheeling planetary gear set including only the sun gear 35, the planet pinions 33, the ring gear 32 and the planet carrier 31. With a free wheeling planetary gear set, there is a constant division of torque, or a torque balance, between shafts 11 and 21, which may be equal or unequal depending upon the gear box design. However, by reason of the free wheeling planetary gear set, the angular velocities of the shafts 11 and 21 may be different appreciably, and it is this difference in the angular velocities of shafts 11 and 21, together with the inherent time constant of the "beta type" pitch changing system, which is employed to achieve the improved result of this invention.

Figure 6:
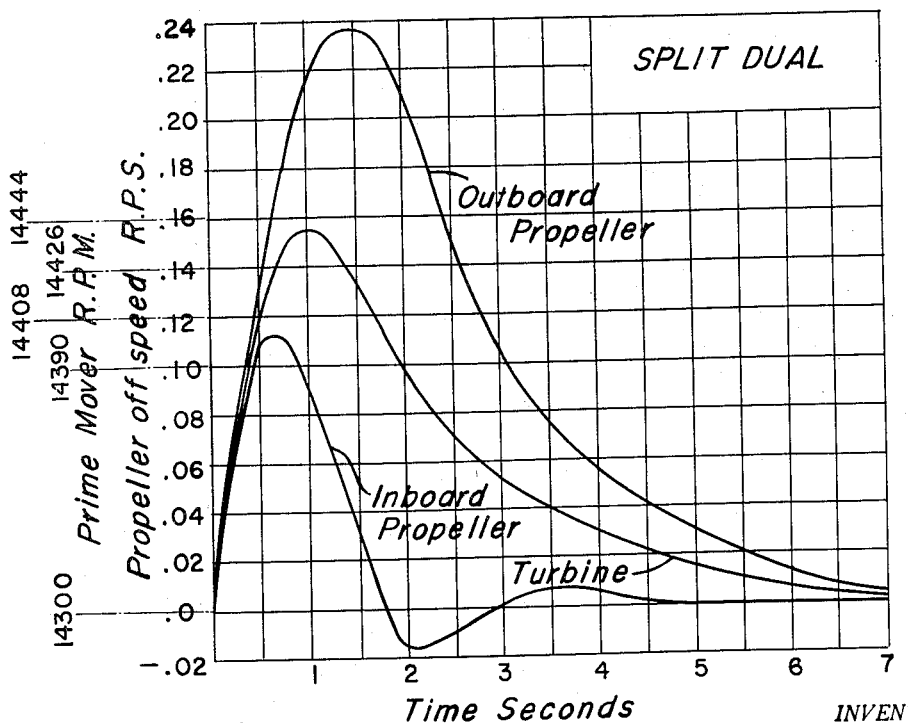
Fig. 6 is a graph depicting the improved situation with the driving arrangement of this invention.

Now, having reference to Fig. 6, the graph illustrates the stability which may be achieved by the mechanism of this invention. In the graph, the abscissa represents time in seconds, while the ordinate represents off-speed of both the propeller elements and the prime mover. The three curves in Fig. 6 are identified as inboard speed, prime mover speed and outboard speed, it being recognized that the angular velocities of the inboard and outboard propeller elements may differ through the free wheeling planetary gear set and whereas the propeller off-speed is represented in revolutions per second, the prime mover speed is represented in revolutions per minute. As the prime mover speed varies from the selected speed, the governor valve 25 of the inboard propeller element responds to the speed deviation and adjusts the pitch of the inboard propeller element blades so as to correct for the speed error. Thus, the inboard propeller speed curve in Fig. 6 is only subjected to a maximum speed error of approximately .115 r.p.s. at about three-quarters of a second. However, as the valve 15 of the pitch adjusting mechanism in the outboard propeller element 10 follows the pitch changes of the inboard propeller element blades, thereby resulting in a predetermined time lag, the outboard propeller element continues to overspeed and reaches a maximum of approximately .24 r.p.s. at one and one-half seconds. Now, as the prime mover speed is the algebraic sum of the inboard and outboard propeller element speeds, it may be seen that the prime mover experiences a maximum over-speed at about one second and of about 14,440 r.p.m., which is about 140 r.p.m. over-speed. Now, recognizing that the variable pitch propellers are provided for maintaining prime mover speed substantially constant, it is desirable to reduce this prime mover over-speed to zero, or 14,300 r.p.m. without "hunting." In other words, it is the object of propeller pitch control systems to achieve stability in prime mover speed control. Thus, as is shown in Fig. 6, the inboard propeller element experiences hunting about the selected, or zero, speed error line, while the outboard propeller element lags the inboard propeller element so that the result of reducing the prime mover over-speed to zero without fluctuations is achieved. Moreover, it will be recognized that speed stability is achieved without the use of artificial acceleration sensitive or damping devices.

Figure 2:
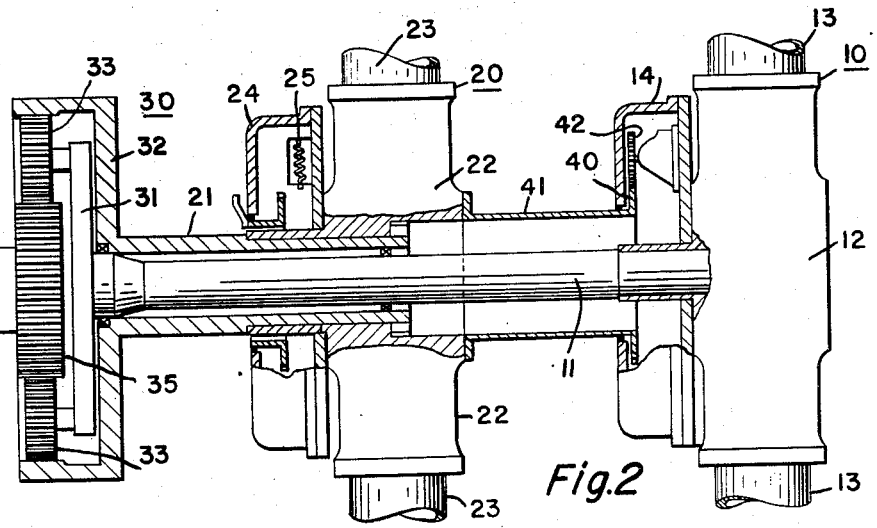
Fig. 2 is a fragmentary view, partly in section and partly in elevation, illustrating a modified embodiment of the system of this invention.
Figure 4:
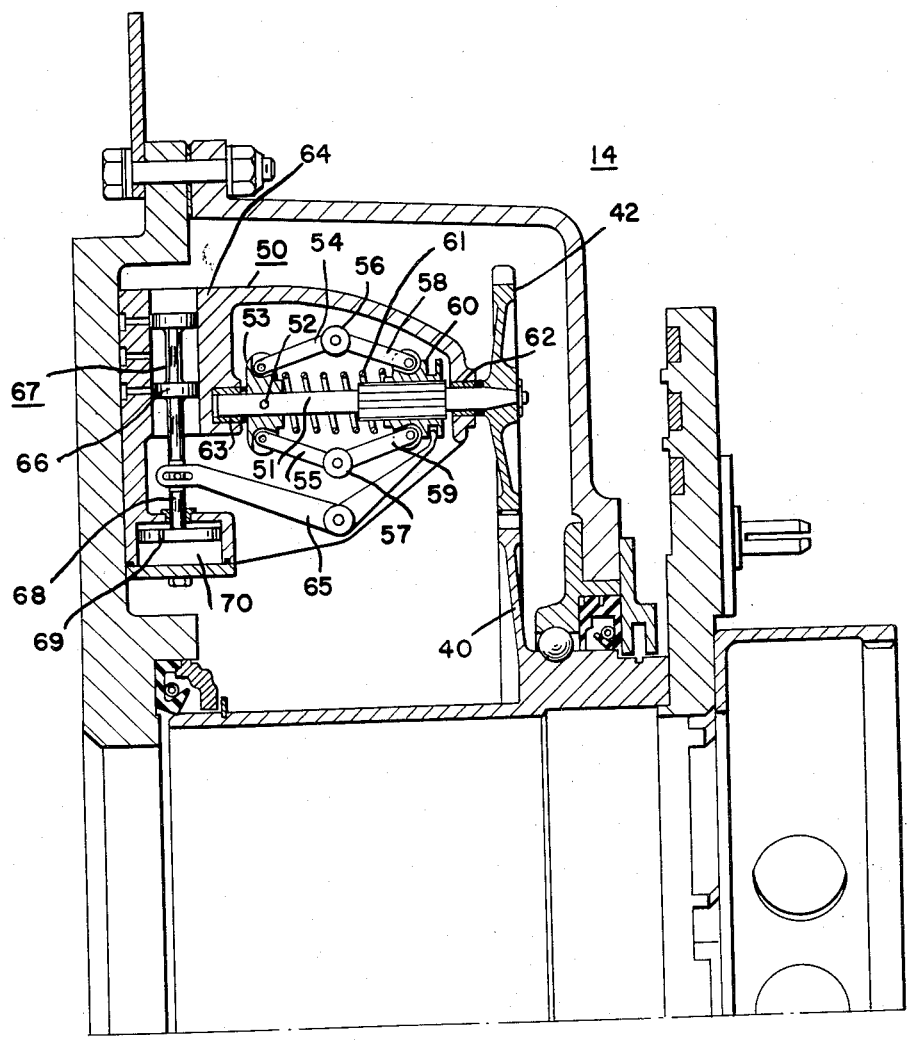
Fig. 4 is a fragmentary, sectional view of the outboard regulator shown in Fig. 2.

With reference to Figs. 2 and 4, a second embodiment of the instant invention is disclosed. In this embodiment like numerals designate similar parts of the propeller assembly indicated in Fig. 1. Accordingly, it may be seen that the contra-rotation propeller assembly is driven through a free wheeling planetary gear set, and the inboard propeller element 20 is of identical construction to the propeller element 20 of Fig. 1. That is, the propeller element 20 includes a hub 22, blades 23, a regulator 24 and a governor valve 25. The outboard propeller element 10 similarly includes a hub 12, blades 13 and a regulator 14. The regulator 14 is shown including a gear 40, which is connected to a tubular element 41 having connection with the inboard propeller element shaft 21. Thus, the gear 40 rotates in a direction opposite to that of the regulator 14. The gear 40 has engagement with a gear 42 within the regulator 14.

With reference to Figs. 2 and 4, the detailed construction of the regulator 14 will be described. The regulator 14 has connected thereto and rotatable therewith a governor valve assembly 50. As is particularly shown in Fig. 4, the governor valve assembly 50 includes a shaft 51 which is rotated by a gear 42 by the gear 40 from the inboard propeller shaft 21. The shaft 51 has attached thereto by means of a pin 52 a collar 53. The collar 53 pivotally supports a pair of links 54 and 55 which carry weights 56 and 57. The weights 56 and 57 are also pivotally connected to a pair of links 58 and 59, which have pivotal support with a collar 60 that is adapted for axial movement relative to the shaft 51. The collar 60 is normally maintained in the position shown in Fig. 4 by means of a spring 61, which circumscribes the shaft 50. Now inasmuch as the shaft 51 is operatively connected to gear 42, it will be appreciated that the shaft 51 and the weights 56 and 57 rotate at a speed proportional to the speed of the inboard propeller element.

The shaft 51 is supported by plain bearings 62 and 63 in a casing 64, which is attached to and rotates with the outboard regulator 14. It will be appreciated that the gearing between the shaft 51 and the inboard propeller 21 is such that the shaft 51 rotates about its own axis in the same direction as the regulator 14 whereupon the fly ball weights 56 and 57 are responsive to the combined speeds of the inboard and outboard propeller elements. The shaft is rotated about its axis at a higher speed than the speed of the outboard regulator 14 due to the fact that the pitch diameter of gear 42 is appreciably smaller than the pitch diameter of gear 40. Moreover, the predominant centrifugal force acting on the fly ball weights 56 and 57 is produced by rotation of shaft 51 about its own axis. Thus, during rotation of the outboard propeller element 10 and the inboard propeller element 20 in opposite directions, the shaft 51 will be rotated by the gear 42 at a speed proportional to a multiple of the sum of the speeds of the outboard and inboard propeller elements. In other words, during rotation of the inboard propeller element 20 and the gear 40 connected to rotate therewith, the shaft 51 will have imparted thereto rotation through the gear 42 which is a multiple of the speed of the inboard propeller element 20. Moreover, by reason of the fact that the outboard propeller element 10 is rotated in the opposite direction and carries within the casing 64, the shaft 51 will also be rotated about its axis at a speed proportional to the same multiple of the outboard propeller element speed through the interaction of gears 40 and 42.

The collar 60 is connected by a bell crank 65 to a centrifugally responsive piston 66 of the governor valve 67. Thus, the forces resultant on the piston 66 produced by the fly balls 56 and the piston 66 are effective to position the governor valve 67 so as to maintain the speed of the outboard propeller element equal to the speed of the inboard propeller element, by actuating the pitch adjusting means of the outboard propeller element. The rod of the piston 66 is also connected to a piston 68 having an orifice 69, therein, the piston 68 being disposed in a cylinder 70. The combination of the piston 68 and the cylinder 70 constitutes a dash pot for introducing an artificial time constant in the governor 50 so as to accomplish the same speed stability control, as is accomplished with the improved mechanism of Fig. 1. The governor 50 functions to maintain the speed of the outboard propeller element in synchronism with the inboard propeller element, and has no absolute reference speed, while the dash pot introduces an artificial time lag to assure speed stability during prime mover off-speeds.

When the speeds of the inboard and outboard elements are the same, the forces tending to move the valve plunger 66 upwardly are in equilibrium with the forces tending to move the plunger 66 downwardly. This is, the thrust of centrifugal force acting on the valve plunger 66 plus the force of spring 61 are exactly equal to the thrust of centrifugal force on the fly ball weights 56 and 57 produced by rotation of the shaft 51 about its own axis. If the speed of the inboard propeller element 20 exceeds the speed of the outboard propeller element 10, the thrust of centrifugal force acting on the fly ball weights 56 and 57 due to rotation of the shaft 51 about its own axis will overcome the opposing force of spring 61 and the thrust of centrifugal force acting on the valve plunger 66 so as to effect movement of the collar 60 to the left, as viewed in Figure 4. Movement of the collar 60 to the left will result in downward movement of the valve plunger 66 through the bellcrank 65, which, in turn results in decreasing the pitch position of the blades of the outboard propeller element 10 so as to cause an increase in the speed thereof. Conversely, if the speed of the outboard propeller element 10 exceeds the speed of the inboard propeller element 20, the force of the spring 61 and the thrust of centrifugal force acting on the valve plunger 66 will overcome the opposing thrust of centrifugal force acting on the fly ball weights 56 and 57 as caused by rotation of the shaft 51 about its own axis to effect movement of the collar 60 to the right as viewed in Figure 4. Movement of the collar 60 to the right will result in upward movement of the valve plunger 66, which, in turn, results in increasing the pitch position of the blades of the outboard propeller element 10 so as to reduce the speed thereof.

Figure 3:
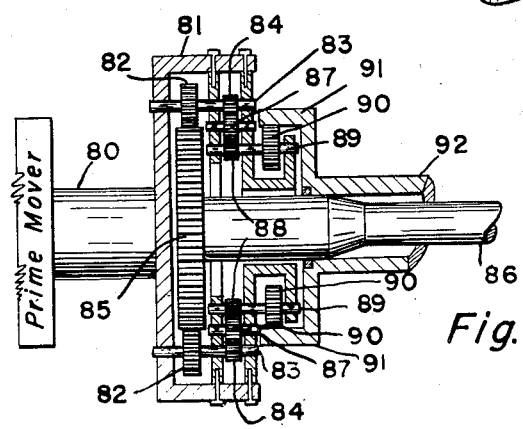
Fig. 3 is an alternate driving arrangement for obtaining an equal torque division between the two propeller elements.

With reference to Fig. 3, a further modification of a gear driving arrangement, which effects an equal torque division between two shafts will next be described. In Fig. 3, the prime mover shaft is denoted by the numeral 80. The prime mover shaft is connected with an annulus 81, which carries a plurality of pinion gears 82. The pinion gears 82 are supported on shafts 83, which also carry pinion gears 84. The pinion gears 82 mesh with a gear 85 connected to an outboard propeller shaft 86. The pinion gears 84 mesh with idler gears 87, which mesh with another set of pinion gears 88. The pinion gears 88 are carried by shafts 89, which carry another set of pinion gears 90, which have operative engagement with an internal gear 91 to which the inboard propeller shaft 92 is connected. The equal torque division between shafts 86 and 92 is achieved by reason of the fact that the pitch diameter of the internal gear 91 is equal to the pitch diameter of the gear 85.

From the foregoing it is manifest that the present invention results in a vastly superior contrarotation propeller assembly, inasmuch as the speed stability is greatly enhanced. Moreover, by reason of the torque balance drive arrangement, the necessity for acceleration sensitive devices has been obviated, thereby appreciably reducing the cost of constant speed propeller assemblies. Moreover, while the present invention aids in the speed stability of propeller mechanisms driven by reciprocative engines, it is more applicable to use with turbine driven propellers, since speed stability with turbines is a requisite. In addition, aircraft stability is enhanced inasmuch as the craft is subject to a constant gyroscopic effect.

While the embodiment of the present invention as herein disclosed, constitutes a preferred form, it is to be understood that other forms might be adopted.

What is claimed is as follows:

1. The combination with a propeller assembly having oppositely rotatable inboard and outboard variable pitch propeller elements, and means operatively associated with the inboard propeller element for automatically adjusting the pitch position thereof so as to maintain a substantially constant speed, of means for rotating said propeller elements in opposite directions so as to maintain a predetermined torque balance therebetween, a governor assembly carried by the outboard propeller element and having parts rotatable with both propeller elements, and pitch adjusting means controlled by said governor whereby the speed of the outboard propeller element is maintained equal to the speed of the inboard propeller element by pitch adjustment thereof.

2. The combination with a propeller assembly having oppositely rotatable inboard and outboard variable pitch propeller elements, and means operatively associated with the inboard propeller element for automatically adjusting the pitch position thereof so as to maintain a substantially constant speed, of means for driving said propeller elements in opposite directions comprising a prime mover and a free wheeling planetary gear set whereby a predetermined torque balance is maintained between said propeller elements, a governor assembly carried by the outboard propeller element and having parts rotatable with both propeller elements, and pitch adjusting means controlled by said governor whereby the speed of the outboard propeller element is maintained equal to the speed of the inboard propeller element by pitch adjustment thereof.

3. The combination with a propeller assembly having oppositely rotatable inboard and outboard variable pitch propeller elements, and means operatively associated with the inboard propeller element for automatically adjusting the pitch position thereof so as to maintain a substantially constant speed, of means for driving said propeller elements in opposite directions and maintaining a predetermined torque balance therebetween, pitch adjusting means for said outboard propeller element, and a fly ball governor assembly carried by said outboard propeller element and responsive to the speed difference between the inboard and outboard propeller elements for controlling said pitch adjusting means so as to maintain said propeller elements in speed synchronism.

4. The combination set forth in claim 3 wherein said fly ball governor assembly comprises a casing connected to rotate with the outboard propeller element, a shaft carrying fly balls, said shaft being rotatably supported in said casing and having operative connection with the inboard propeller element so as to rotate about its axis at a speed proportional to the combined speeds of the inboard and outboard propeller elements, and means controlled by said fly balls for actuating the pitch adjusting means of the outboard propeller element so as to maintain speed synchronization of the inboard and outboard propeller elements.

5. The combination set forth in claim 3 wherein the means for driving the propeller elements in opposite directions includes a prime mover and a free wheeling planetary gear set.

6. The combination set forth in claim 4 wherein the means controlled by said fly balls comprises a centrifugally responsive valve member rotatable with the outboard propeller element.

7. Means for comparing the speeds of two oppositely rotating elements comprising a member carried by one of said elements and rotatable therewith, a shaft rotatably supported in said member and operatively connected with the other of said elements so as to rotate at a speed proportional to the combined speeds of said elements, centrifugally responsive means carried by said shaft comprising a first collar fixed to said shaft, a second collar slidably mounted on said shaft, and a fly ball assembly pivotally connected with said collars, and means operatively connected to said slidable collar whereby the position of said slidable collar is indicative of the speed differences between said two elements.

8. The combination set forth in claim 7 wherein the means operatively connected with the slidable collar comprises a centrifugally responsive member carried by and rotatable with said one element.

References Cited in the file of this patent

UNITED STATES PATENTS

| 1,091,686 | Miller | Mar. 31, 1914 |
| 1,389,382 | Rigsby | Aug. 30, 1921 |
| 1,434,620 | McCain | Nov. 7, 1922 |
| 2,085,483 | Trebucien | June 29, 1937 |
| 2,154,532 | Ryder | Apr. 18, 1939 |
| 2,362,444 | Blanchard et al. | Nov. 14, 1944 |
| 2,416,662 | Lundquist | Feb. 25, 1947 |
| 2,421,514 | Martin et al. | June 3, 1947 |
| 2,522,443 | Gaubatz et al. | Sept. 12, 1950 |
| 2,533,346 | Brady et al. | Dec. 12, 1950 |

FOREIGN PATENTS

| 877,268 | France | Sept. 1, 1942 |
| 998,574 | France | Sept. 26, 1951 |